United States Patent Office 2,764,519
Patented Sept. 25, 1956

2,764,519
SUBSTITUTED CYCLOHEXYLAMINES AND
PROCESS FOR PREPARING SAME

Frank John Villani, Cedar Grove, N. J., assignor to Schering Corporation, Bloomfield, N. J., a corporation of New Jersey No Drawing. Application December 18, 1953,
Serial No. 399,149

15 Claims. (Cl. 167—65)

The present invention relates to a new group of compounds having significant pharmacological and physiological properties, and more particularly to substituted cyclohexylamines and their non-toxic acid addition and quaternary salts, which possess pronounced anti-spasmodic and parasympathetic blocking activity, and to intermediates for preparing these compounds, as well as to processes for manufacturing the same.

The substituted cyclohexylamines of this invention may be represented by the following general formula:

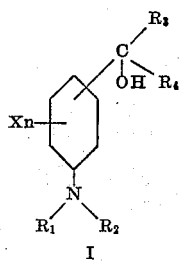

I and their non-toxic acid addition and quaternary salts. In this formula, $R_1$ and $R_2$ are lower alkyl radicals; $R_3$ and $R_4$ are the same or different members of the group consisting of saturated and unsaturated carbocyclic radicals, such as cycloalkyl and aryl radicals, and heterocyclic radicals in which the hetero atom is nitrogen or sulfur; X is lower alkyl, such as methyl, ethyl and propyl; and $n$ is an integer from 0 to 3. Representative of the groups $R_1$ and $R_2$ are methyl, ethyl, propyl, and butyl; and examples of the groups $R_3$ and $R_4$ are cyclohexyl, cyclopentyl, phenyl, 2-thienyl, and 2-pyridyl, as well as the chloride, bromide, lower aliphatic alkoxy and lower alkyl substitution products of the cyclic groups, the amino group is in either the 3- or 4-position.

Examples of the quaternary salts are the methiodide, methchloride, methbromide, methsulfate, etc. of the tertiary amine. The quaternary salts of the carbinol compounds of the invention, for example, $\alpha,\alpha^1$-dithienyl-4-dimethylaminocyclohexyl carbinol methyl halide are particularly advantageous in the control of gastric secretion and gastric motility. In addition to the quaternary salts, acid addition salts such as the hydrochloride, tartrate, maleate, citrate and salicylate compounds of the general formula have also been found to possess therapeutic properties of the kind indicated.

The compounds of this invention are preferably administered orally in the form of tablets, elixirs, capsules and the like. As a tablet, they may be compounded with an inert carrier which may, or may not, contain one of the more usual types of binders used in the industry, such as bums, sugars, starches, etc. The compound may also be formulated into elixirs which have the advantage of being susceptible to manipulations in flavor by the addition of the desired natural or synthetic flavoring material. In many cases, it is desired to administer an anticholinergic drug parenterally and thus the compounds of this invention are conveniently formulated into injectable solutions with non-toxic carriers such as water, ethyl alcohol, polyethylene glycol which, in turn, may be sterilized before administration. Furthermore, these compounds may be formulated into topical ointments, creams and the like when absorption through the skin or mucosa is the preferred mode of administration.

In general, the compounds of the present invention may be prepared by several methods. To prepare compounds of general Formula I, wherein $R_1=R_2$, we have found the hitherto unreported dialkylaminocyclohexylcarboxylic esters to be useful intermediates, and are conveniently prepared by known methods. For example, by hydrogenating ethyl p-aminobenzoate in alcoholic hydrochloric acid in the presence of platinum oxide, there is obtained ethyl-p-aminocyclohexylcarboxylate. Dialkylation of the amino group is conveniently performed by methods familiar to those skilled in the art, such as dimethylation through the use of formic acid and formaldehyde. Alternatively, ethyl p-dimethylaminobenzoate may be reduced to the corresponding cyclohexylcarboxylic ester through the use of platinum oxide catalyst in acetic acid. Where it is desired to have alkyl groups other than methyl as substituents, we have found the following reaction sequence to be highly satisfactory:

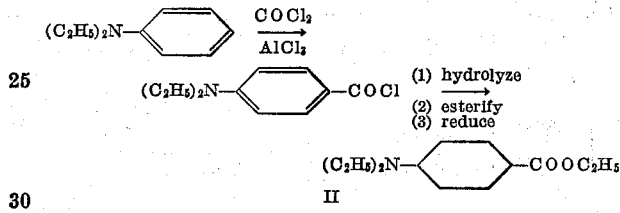

II

Treating a dialkylaniline such as diethylaniline with phosgene in the presence of aluminum chloride according to described procedures, there is obtained in the reaction mixture diethylaminobenzoyl chloride. Rather than esterify this acid chloride by the addition of an alcohol, we prefer to hydrolyze the mixture with water whereby a facile separation of unreacted materials may be effected by steam distillation. After isolation of the dialkylaminobenzoic acid, esterification and reduction to the corresponding dialkylaminocyclohexylcarboxylic acid ester may be performed by any of the conventional methods. Although we have described the preparation of the ethyl esters, it is to be understood that other esters such as methyl, propyl, etc., may be used as starting materials.

Conversion of these esters to compounds of general Formula I can be effected according to the following sequence of reactions:

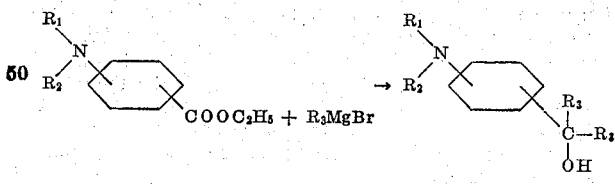

III wherein $R_3=R_4$. More specifically, treating ethyl p-dimethylaminocyclohexyl-carboxylate with phenyl magnesium bromide in ether or benzene solvent according to described procedures for carrying out the Grignard reaction, results in the formation of the carbinol Compound IV.

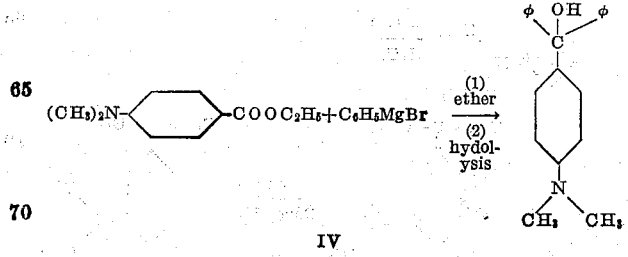

IV

In an analogous manner, compounds containing the dithienyl-, dicycloalkyl groups etc., may be prepared. In some instances, where it is difficult, if not impossible, to effect a Grignard reaction, we have found the use of other organometallic reactants to be applicable. For example, the dipyridyl compound is preferably prepared from the dialkylaminocyclohexyl-carboxylic acid ester and the suitable pyridyl lithium compound; the latter being prepared in a conventional manner from the corresponding bromopyridine and butyl-lithium. Although organolithium reactants such as phenyl-lithium, thienyl-lithium, lithium alkyls, etc., may be employed to prepare the compounds of general Formula I, we prefer to use a Grignard reaction where applicable.

To prepare compounds of this invention, wherein R₃ is not identical with R₄, we have found the following reaction sequence to be applicable:

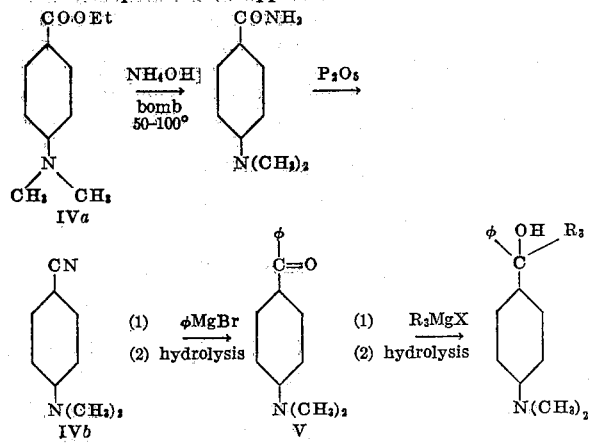

Treating ethyl α-dialkylaminocyclohexylcarboxylic acid ester, specifically ethyl p-dimethylaminocyclohexylcarboxylate, with concentrated aqueous ammonia in a sealed vessel at 50 to 100°, yields the corresponding acid amide (IVa). The amide is subjected to dehydrating conditions such as heating with phosphorous pentoxide, whereupon there is obtained p-dimethylaminocyclohexyl-nitrile (IVb). Reacting this nitrile with one equivalent of a Grignard reagent, phenyl magnesium bromide, for example, yields according to known procedures the ketone as shown as V. Subjecting this unsymmetrical ketone to the action of a Grignard reagent yields carbinols of general Formula I in which R₃ and R₄ are dissimilar.

The unsaturated compounds of general Formula I may be prepared from the corresponding carbinols according to a variety of dehydration procedures, such as heating the carbinol with sulfuric acid, potassium acid sulfate, thionyl chloride, etc. We prefer to effect the dehydration through the use of a refluxing mixture of glacial acetic acid and concentrated hydrochloric acid. For example, heating a mixture of diphenyl-3-dimethylaminocyclohexyl carbinol in acetic acid-hydrochloric acid mixture yields the corresponding cyclohexylidene Compound VII which can be reduced to the saturated methane derivative:

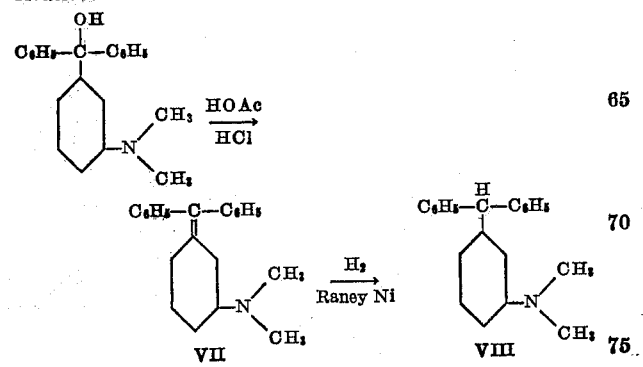

The fully saturated non-sulfur containing compounds are easily prepared from the cyclohexylidene-type by hydrogenation in the presence of one of the more usual catalysts such as Raney nickel in alcohol. For example, treating an alcoholic solution of Compound VII with hydrogen in the presence of Raney nickel at 1500 lb. pressure and about 150° C. yields diphenyl-3-dimethyl-aminocyclohexyl methane (VIII). Saturated compounds of general Formula I, may also be prepared according to the following reaction sequence:

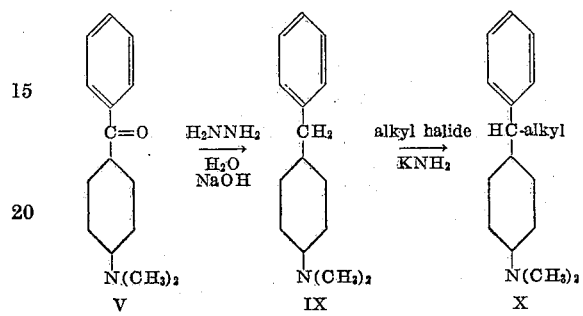

Treating the intermediate ketone (V) with hydrazine hydrate and sodium hydroxide in a known manner affords 1-dimethylamino-4-benzyl-cyclohexane (IX). Alkylation of the benzyl-cyclohexane compound (IX) with an alkyl halide in the presence of potassium amide yields the saturated compounds of the general Formula I, wherein R₃ is alkyl and R₄ is aryl.

The compound of Formula X and similar compounds may alternately be prepared via the following route: Acylation of acetanilide with butyryl chloride in the presence of aluminum chloride yields p-acetylaminobu-tyrophenone. Hydrolysis, followed by alkylation with, for example, formic acid and formaldehyde, yields the corresponding dimethylaminobutyrophenone (XI). A Grignard reaction with this ketone and a halide such as cyclopentyl bromide results in the formation of a tertiary carbinol (XII). Hydrogenolysis of XII at elevated temperature and pressure gives 1-cyclopentyl-1-(p-dimethyl-aminocyclohexyl)-butane (XIII):

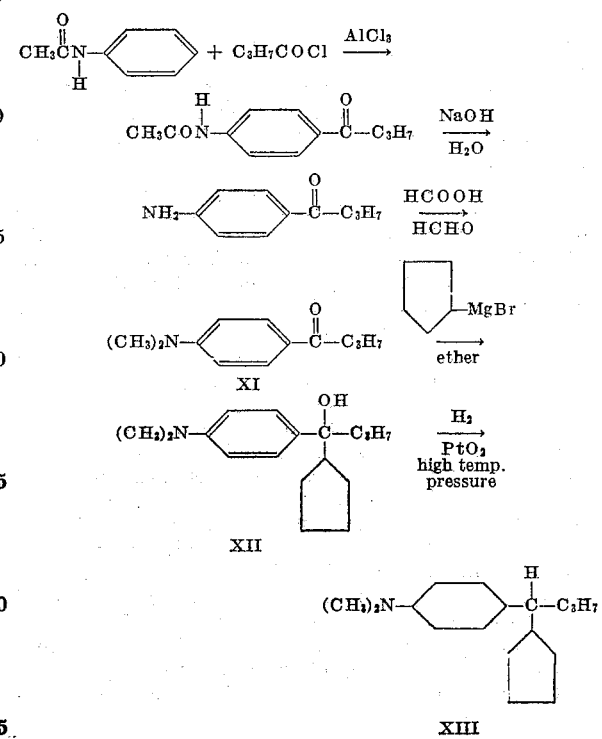

Compounds of general Formula I, wherein Y is acyloxy, may be prepared in a conventional manner by reacting the carbinol with an appropriate acid anhydride in the presence of a trace of mineral acid. For example, according to the following equation, treating diphenyl-p-dimethylaminocyclohexyl carbinol with propionic anhydride in the presence of a few drops of mineral acid, such as concentrated sulfuric acid, yields the corresponding propionate (XIII):

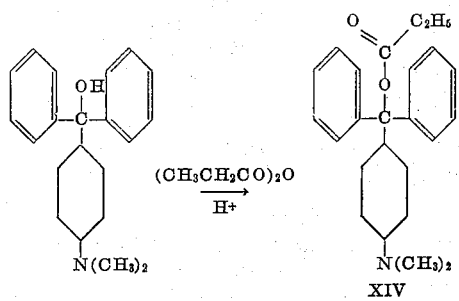

XIV

Similarly, the use of acetic anhydride or butyric anhydride will afford the corresponding acetate and butyrate, respectively.

The acid addition salts of the compounds of general Formula I are prepared by any of the known methods such as bubbling anhydrous hydrochloric acid through an ether solution of the tertiary amine or combining equivalent amounts of tertiary amine and acid of choice, such as maleic, tartaric, citric, etc. in alcohol solution and concentrating to obtain the crystalline salt. The quaternary ammonium salts are conveniently prepared by heating the tertiary amine with an appropriate halide with or without a solvent. Where it is desired to prepare quaternary ammonium alkyl sulfates, we have found the use of alkyl esters of sulfuric acid useful, for example, heating the tertiary amine with an equivalent of dimethyl sulfate in benzene solution according to known procedures, results in the formation of the corresponding quaternary ammonium methsulfate. By heating a quaternary ammonium iodide in methanol solution with a slight excess of silver bromide, or silver chloride, facile transformation from the iodide to the other halide may be effected.

The following examples describe more in detail the preparation of some of the compounds of this invention, but it is to be understood that they are presented by way of illustration only, and not as indicating the scope of the invention:

EXAMPLE I

*Diphenyl-4-dimethylaminocyclohexyl carbinol*

The requisite intermediate, ethyl 4-dimethylaminocyclohexyl carboxylate is prepared as follows: Thirty-three grams of ethyl p-aminobenzoate dissolved in 300 cc. of absolute ethanol containing 16.8 cc. of concentrated hydrochloric acid is hydrogenated at 50 lbs. hydrogen pressure in the presence of 2 grams of platinum oxide. The theoretical quantity of hydrogen is absorbed in several hours, the catalyst removed by filtration and the filtrate concentrated to dryness in vacuo. The residue is dissolved in water, made alkaline with ammonium hydroxide and extracted with chloroform. After removal of the solvent, the residual oil is distilled to yield ethyl 4-aminocyclohexyl carboxylate, B. P. 114–117°/10 mm.

A mixture of 49 g. of this ester compound, 76 g. of 98% formic acid and 68 ml. of formalin solution is heated under reflux for 8 hours. The solvents are then removed in vacuo on the steam bath, the residue dissolved in water, made alkaline with ammonium hydroxide and extracted with chloroform. Removal of the solvent and distillation in vacuo yields ethyl 4-dimethylaminocyclohexyl carboxylate, B. P. 122–125°/10 mm.

A solution of 0.2 mole of the dimethylamino compound in 50 cc. of absolute ether is added to a cooled, well-stirred ether solution of phenyl magnesium bromide (0.8 mole) prepared in the conventional manner. The mixture is allowed to warm to room temperature and stirred for an additional six hours. The reaction mixture is then decomposed with dilute ammonium chloride solution and extracted with ether. The combined ether extracts are extracted thoroughly with 10% hydrochloric acid and the acid solution made alkaline with ammonium hydroxide. The aqueous solution is extracted with chloroform which is then washed with water, dried and evaporated to a residue in vacuo. Recrystallization of the residue from hexane yields diphenyl-4-dimethylaminocyclohexyl carbinol, M. P. 150.5–151°.

EXAMPLE II

*α,α¹-Dithienyl-4-dimethylaminocyclohexyl carbinol*

To a solution of thienyl magnesium bromide prepared from 21.4 g. of magnesium and 144 g. of 2-bromothiophene are added 39.8 g. of ethyl 4-dimethylaminocyclohexylcarboxylate. Following the procedure of Example I there is obtained α,α¹-dithienyl-4-dimethylaminocyclohexyl carbinol, M. P. 156/157° after recrystallization from benzene.

EXAMPLE III

*α,α¹-Dithienyl-4-dimethylaminocyclohexyl carbinol methiodide*

To an ether solution of 5 grams of the carbinol of Example II is added 10 cc. of methyl iodide and the mixture refrigerated overnight at 0–5° C. The precipitated quaternary salt is filtered and recrystallized from absolute ethanol-absolute ether to yield α,α¹-dithienyl-4-dimethylaminocyclohexyl carbinol methiodide, M. P. 251–252° C.

EXAMPLE IV

*α,α¹-Dithienyl-4-dimethylaminocyclohexyl carbinol dimethyl sulfate*

A mixture of 10 cc. dimethyl sulfate and 5 g. of the carbinol of Example II in benzene solution is refluxed for 10–15 minutes. After cooling, the salt is filtered and recrystallized from absolute ethanol to yield α,α¹-dithienyl-4-dimethylaminocyclohexyl carbinol dimethyl sulfate, M. P. 200–201°.

EXAMPLE V

*Diphenyl-3-dimethylaminocyclohexyl carbinol*

Ethyl-3-aminocyclohexylcarboxylate is prepared as described for the 4-isomer in Example I, B. P. 107–113°/4 mm.; the dimethylamino compound boils at 100–107° C. (3 mm.). Following the procedure of Example I there is obtained diphenyl-3-dimethylaminocyclohexyl carbinol, M. P. 133–134°, recrystallizable from hexane.

EXAMPLE VI

*α,α¹ - Dithienyl - 3 - dimethylaminocyclohexyl carbinol*

To a solution of thienyl magnesium bromide prepared from 10.7 g. of magnesium and 72 g. of 2-brom thiophene is added 19.9 g. of ethyl 3-dimethylaminocyclohexyl carboxylate. Following the procedure of Example I there is obtained α,α¹-dithienyl-3-dimethylaminocyclohexyl carbinol, M. P. 164–165° after recrystallization from benzene-petroleum ether.

EXAMPLE VII

*Diphenyl - (4 - methyl - 3 - dimethylamino) - cyclohexyl carbinol*

Ethyl 4-methyl-3-amino benzoate is reduced and dimethylated according to the procedure of Example I to yield ethyl 4-methyl-3-aminocyclohexylcarboxylate (B. P. 93–100°/1 mm.) and ethyl 4-methyl-3-dimethylaminocyclohexylcarboxylate, 103–109°/3 mm. By reacting the dimethylamino ester with phenylmagnesium bromide as described in Example I there is obtained diphenyl-(4-methyl - 3 - dimethylamino) - cyclohexyl carbinol, M. P. 179.5–181° after recrystallization from methanol.

EXAMPLE VIII

*Diphenyl - (4 - methyl - 3 - dimethylamino) - cyclohexyl carbinol methiodide*

By treating the carbinol of Example VII with methyl iodide according to the procedure in Example III, there is obtained diphenyl-(4-methyl-3-dimethylamino)-cyclohexyl carbinol methiodide, M. P. 241–242°.

EXAMPLE IX

*$\alpha,\alpha^1$ - Dithienyl - (4 - methyl - 3 - dimethylamino)cyclohexyl carbinol*

By reacting ethyl-4-methyl-3-dimethylaminocyclohexylcarboxylate with 2-brom thiophine by the method described in Example II there is obtained $\alpha,\alpha^1$-dithienyl-(4-methyl-3-dimethylamino) cyclohexyl carbinol, M. P. 160–161.5° after recrystallization from methanol.

EXAMPLE X

*$\alpha,\alpha^1$ - Dithienyl - (4 - methyl - 3 - dimethylamino) cyclohexyl carbinol dimethyl sulfate*

By treating 5 g. of the carbinol of Example IX with 10 cc. of dimethyl sulfate according to the procedure of Example IV, there is obtained $\alpha,\alpha^1$-dithienyl-(4-methyl-3-dimethylamino) cyclohexyl carbinol dimethyl sulfate M. P. 116–118° after recrystallization from ethanol.

EXAMPLE XI

*$\alpha,\alpha^1$-Dipyridyl-4-dimethylaminocyclohexyl carbinol*

To a stirred suspension of 2 g. atoms of lithium in 1 liter of anhydrous ether at 0°, there are dropwise added 1.0 mole of n-butyl bromide. When the reaction is complete, the mixture is chilled in a Dry Ice bath to approximately —30° and 1.0 mole of 2-bromo-pyridine is added dropwise. To the chilled suspension of 2-pyridyl lithium, while stirring, there is slowly added 0.25 mole of ethyl 4-dimethylaminocyclohexylcarboxylate. The mixture is allowed to warm to room temperature and is stirred for an additional 6–8 hours. After pouring the reaction mixture into ice-water, the layers are separated and the ether solution of the carbinol is washed thoroughly with water and dried with potassium carbonate. Evaporation of the solvent yields 0.12 mole of $\alpha,\alpha^1$-dipyridyl-4-dimethylaminocyclohexyl carbinol.

EXAMPLE XII

*$\alpha,\alpha^1$ - Dipyridyl - 4 - dimethylaminocyclohexyl carbinol methiodide*

A solution of 5 g. of the carbinol of Example XI in 50 ml. of anhydrous ether is treated with 10 ml. of methyl iodide, as described in Example III. Recrystallization from ethanol-ether yields $\alpha,\alpha^1$-dipyridyl-4-dimethylaminocyclohexyl carbinol methiodide.

EXAMPLE XIII

*Dicyclohexyl-3-dimethylaminocyclohexyl carbinol*

From the reaction of 0.2 mole of ethyl 3-dimethylaminocyclohexyl carboxylate and 0.8 mole of cyclohexyl magnesium bromide, according to the procedure of Example I, there is obtained dicyclohexyl-3-dimethylaminocyclohexyl carbinol, B. P. 180–185°/2 mm.

EXAMPLE XIV

*p,p'-Dichlorodiphenyl-4-dimethylaminocyclohexyl carbinol*

By substituting 0.8 mole of p-chlorophenyl magnesium bromide in the reaction described in Example I, there is obtained p,p' - dichlorodiphenyl - 4-dimethylaminocyclohexyl carbinol recrystallizable from benzene-hexane.

Dehydration, hydrogenation and quaternization are accomplished as previously described.

EXAMPLE XV

*m,m'-Dimethoxydiphenyl-3-dimethylaminocyclohexyl carbinol*

Substituting m-methoxyphenyl magnesium bromide in the procedure described in Example V yields m,m'-dimethoxydiphenyl-3-dimethylaminocyclohexyl carbinol.

EXAMPLE XVI

*p,p'-Ditolyl-4-dimethylaminocyclohexyl carbinol*

By substitution of the Grignard reagent employed in Example I by an equivalent amount of p-tolyl magnesium bromide, there is obtained in an analogous manner p,p'-ditolyl-4-dimethylaminocyclohexyl carbinol as a white crystalline solid recrystallizable from hexane.

EXAMPLE XVII

*Diphenyl-4-dimethylaminocyclohexylcarbinyl propionate*

A mixture of 10 g. of the carbinol obtained in Example I, 100 ml. of propionic anhydride and 5 to 10 drops of concentrated sulfuric acid is allowed to stand overnight at room temperature. The mixture is then concentrated to a residue in vacuo and the residue treated with 200 ml. of dilute alkali. The alkaline mixture is extracted with ether and the ether solution dried and evaporated to yield a residue which, upon recrystallization from ethanol, gives diphenyl-4-dimethylaminocyclohexylcarbinyl propionate.

EXAMPLE XVIII

*$\alpha,\alpha^1$-Dithienyl-4-dimethylaminocyclohexyl carbinol methylbromide*

A solution of 10 g. of the carbinol of Example II in 300 ml. of anhydrous benzene, is saturated with methyl bromide and allowed to stand at room temperature. The deposited crystals are removed by filtration and recrystallized from ethanol-ether to yield $\alpha,\alpha^1$-dithienyl-4-dimethylaminocyclohexyl carbinol methylbromide, M. P. 231–232°.

EXAMPLE XIX

*Diphenyl-3-methyl-4-dimethylaminocyclohexyl carbinol*

The requisite intermediate, ethyl 3-methyl-4-aminobenzoate, is prepared as follows: A solution of 100 g. of 3-methyl-4-aminobenzoic acid in 500 ml. of ethanol and 25 ml. of concentrated sulfuric acid is refluxed for 6 hours. The mixture is cooled, concentrated to a low volume, and the residue treated with dilute alkali. The alkaline mixture is extracted with ether, which is dried and distilled in vacuo to yield the ethyl ester.

The above ethyl ester is reduced and methylated according to the procedure described in Example I, yielding ethyl 3 - methyl - 4 - dimethylaminocyclohexylcarboxylate. Treating the dimethylamino compound obtained above with phenyl magnesium bromide, according to the procedure of Example I, yields, after recrystallization from hexane, diphenyl-3-methyl-4-dimethylaminocyclohexyl carbinol.

EXAMPLE XX

*$\alpha,\alpha^1$-dithienyl-3-methyl-4-dimethylaminocyclohexyl carbinol*

From the reaction of ethyl 3-methyl-4-dimethylaminocyclohexylcarboxylate and 2-bromothiophene, according to the procedure of Example II, there is obtained after recrystallization from benzene the carbinol of this example.

The acid addition salts of the above-described bases can be prepared by mixing the two in combining proportions in a suitable solvent and then evaporating the latter. To produce the salts of various non-toxic organic acids, like acetic, propionic, succinic, maleic, tartaric, citric, benzoic, salicylic, and the like, the quaternary halide can be treated with an alkali metal hydroxide to convert it to the quaternary ammonium hydroxide which is then neutralized with an equivalent amount of the organic acid.

It will be evident from the foregoing that with the procedures herein described, compounds in which the substituents $R_1$, $R_2$, $R_3$, $R_4$ and X represent a large variety of combinations of radicals can be readily obtained.

As indicated above, the compounds of the invention can be administered in various ways, as in the form of a tablet mixed with a non-toxic pharmaceutical carrier or in the form of a flavored aqueous alcohol solution or suspension of the medicinal to be administered as an elixir. The compounds can be administered also in a gelatin capsule. The adult dosage will range from about 5 mg. to about 100 mg. per day.

I claim:
1. A compound selected from the group consisting of substituted cyclohexyl amines of the formula:

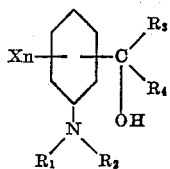

and their non-toxic acid addition and quaternary salts, wherein $R_1$ and $R_2$ are lower alkyl radicals; $R_3$ and $R_4$ are members of the class consisting of phenyl, 2-pyridyl, 2-thienyl, and cyclohexyl radicals; X is a lower alkyl radical; and $n$ is an integer from 0 to 3, the amino group being in one of the 3- and 4- positions.

2. A pharmaceutical preparation comprising a non-toxic carrier mixed with a compound as defined in claim 1.

3. A therapeutically acceptable lower alkyl quaternary salt of $\alpha,\alpha^1$-dithienyl-4-dimethylaminocyclohexyl carbinol.

4. $\alpha,\alpha^1$ - Dithienyl - 4 - dimethylamino-cyclohexyl carbinol methylbromide.

5. The lower alkyl halide quaternary salts of dithienyl [4-di-(lower alkyl)-amino-cyclohexyl] carbinol.

6. Diphenyl [4-di-(lower alkyl)-amino-cyclohexyl] carbinol.

7. Phenyl 2-pyridyl [4-di-(lower alkyl)-amino-cyclohexyl] carbinol.

8. Phenyl 2 - pyridyl - (4 - dimethylaminocyclohexyl) carbinol.

9. Diphenyl (4-dimethylaminocyclohexyl) carbinol methyl bromide.

10. 2,2' - Dipyridyl (4 - dimethylamino - cyclohexyl) carbinol.

11. Process for the manufacture of compounds of the formula

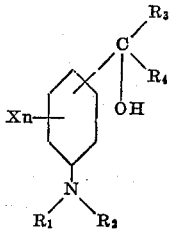

wherein $R_1$ and $R_2$ are lower alkyl radicals; $R_3$ and $R_4$ are members of the class consisting of phenyl, 2-pyridyl, 2-thienyl and cyclohexyl radicals; X is lower alkyl; and $n$ is an integer from 0 to 3 the amino group being in one of the 3- and 4-positions, which comprises reacting a compound of the formula

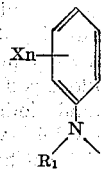

wherein $R_1$, $R_2$, X and $n$ are as above defined, with phosgene to produce the corresponding benzoyl chloride compound, hydrolyzing the latter to the benzoic acid derivative, esterifying the latter, hydrogenating the product to the corresponding cyclohexyl derivative, and reacting the last with the compound $R_3$ Mg Z, wherein $R_3$ is as above defined, and Z is a member of the group consisting of bromine and iodine, and hydrolyzing the organomagnesium complex so obtained.

12. Process for the manufacture of compounds of the formula

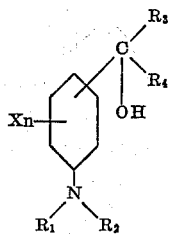

wherein $R_1$ and $R_2$ are lower alkyl radicals; $R_3$ and $R_4$ are members of the class consisting of phenyl, 2-pyridyl, 2-thienyl and cyclohexyl radicals; X is lower alkyl; and $n$ is an integer from 0 to 3 the amino group being in one of the 3- and 4-positions, which comprises reacting a cyclohexyl compound of the formula

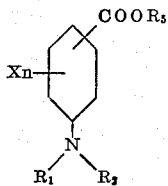

wherein $R_5$ is a member of the group consisting of aliphatic and aromatic hydrocarbon radicals, with the compound $R_3MgZ$, wherein Z is a member of the group consisting of bromine and iodine, and hydrolyzing the resulting organo-magnesium complex.

13. Process for the manufacture of compounds of the formula

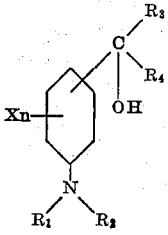

wherein $R_1$ and $R_2$ are lower alkyl radicals; $R_3$ and $R_4$ are members of the class consisting of phenyl, 2-pyridyl, 2-thienyl and cyclohexyl radicals; X is lower alkyl; $n$ is an integer from 0 to 3; and the amino group being in one of the 3- and 4-positions, which comprises reacting a cyclohexyl compound of the formula

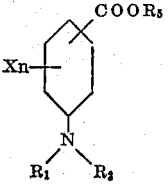

wherein $R_5$ is a member of the group consisting of aliphatic and aromatic hydrocarbon radicals, with ammonia at elevated temperature and pressure to form the corresponding amide, dehydrating the latter to the nitrile, reacting the nitrile with the compound $R_3MgZ$, wherein $R_3$ is as above defined while Z is a member of the group consisting of bromine and iodine, hydrolyzing the product, reacting the $R_3$-cyclohexyl ketone so obtained with the compound $R_4MgZ$, and hydrolyzing the obtained organo-magnesium complex.

14. Process for the manufacture of therapeutically active compounds, which comprises reacting a cyclohexyl compound of the formula

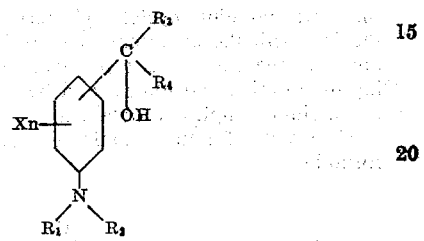

wherein $R_1$ and $R_2$ are lower alkyl radicals; $R_3$ and $R_4$ are members of the class consisting of phenyl, 2-pyridyl, 2-thienyl, X is a member of the class consisting of hydrogen and lower alkyls, and cyclohexyl radicals; and $n$ is an integer from 0 to 3, the amino group being in one of the 3- and 4-positions, with a member of the class consisting of hydrocarbon iodides, bromides, chlorides and sulfates to form the corresponding quaternary salts.

15. Process as defined in claim 14, including the step of reacting the quaternary salts with an alkali to form the quaternary ammonium hydroxide, and neutralizing the latter with a non-toxic organic acid.

References Cited in the file of this patent

UNITED STATES PATENTS

| | | |
|---|---|---|
| 2,520,516 | Van Zoeren | Aug. 29, 1950 |
| 2,680,115 | Ruddy | June 1, 1954 |
| 2,686,785 | Duffin | Aug. 17, 1954 |

OTHER REFERENCES

Beilstein, vol. 12, page 23, 2nd suppl.